United States Patent [19]

Kessler

[11] Patent Number: 5,241,523
[45] Date of Patent: Aug. 31, 1993

[54] POLARIZATION-BASED AUTO-FOCUS APPARATUS

[75] Inventor: David Kessler, Rochester, N.Y.
[73] Assignee: Eastman Kodak Company, Rochester, N.Y.
[21] Appl. No.: 802,600
[22] Filed: Dec. 5, 1991
[51] Int. Cl.$^5$ .......................... G11B 7/00; G11B 21/10
[52] U.S. Cl. .............................. 369/44.14; 369/44.41; 369/110; 369/13
[58] Field of Search ............... 369/44.11, 44.14, 44.23, 369/44.24, 44.41, 44.42, 110, 112; 369/13, 109; 360/114; 250/201.5

[56] References Cited

U.S. PATENT DOCUMENTS

| | | | |
|---|---|---|---|
| 3,941,476 | 3/1976 | Stauffer | 356/3 |
| 4,661,944 | 4/1987 | Van Sluys | 369/44.41 |
| 4,712,205 | 12/1987 | Smid et al. | 369/44.41 |
| 4,721,368 | 1/1988 | Deguchi et al. | 369/110 X |
| 4,773,053 | 9/1988 | Gottfried | 369/110 X |
| 4,779,250 | 10/1988 | Kogue et al. | 360/114 |
| 4,888,752 | 12/1989 | Arai | 369/44.23 |
| 4,953,124 | 8/1990 | Koyama | 369/13 X |
| 4,972,075 | 11/1990 | Hamada et al. | 369/44.23 |
| 5,033,828 | 7/1991 | Haruta | 369/110 X |
| 5,105,410 | 4/1992 | Maeda et al. | 369/112 |

FOREIGN PATENT DOCUMENTS 0251456 10/1989 Japan .................................. 369/110

Primary Examiner—Andrew L. Sniezek
Assistant Examiner—Thang V. Tran
Attorney, Agent, or Firm—Robert L. Randall

[57] ABSTRACT

Focus apparatus is disclosed for use as a focus error detector in an optical system. The apparatus comprises two polarizer elements of different polarization disposed at the pupil of a focusing lens. A detector is positioned at an image plane to intercept a beam from the lens and polarizer elements. The detector includes a detector element which is adapted to detect radiation in four quadrants, and an analyzer which is disposed in front of the detector element. The analyzer includes two polarizers of different polarization arranged at right angles to the polarizers disposed at the pupil of the lens. An electronic circuit is coupled to the detector for producing a focus error signal.

12 Claims, 5 Drawing Sheets

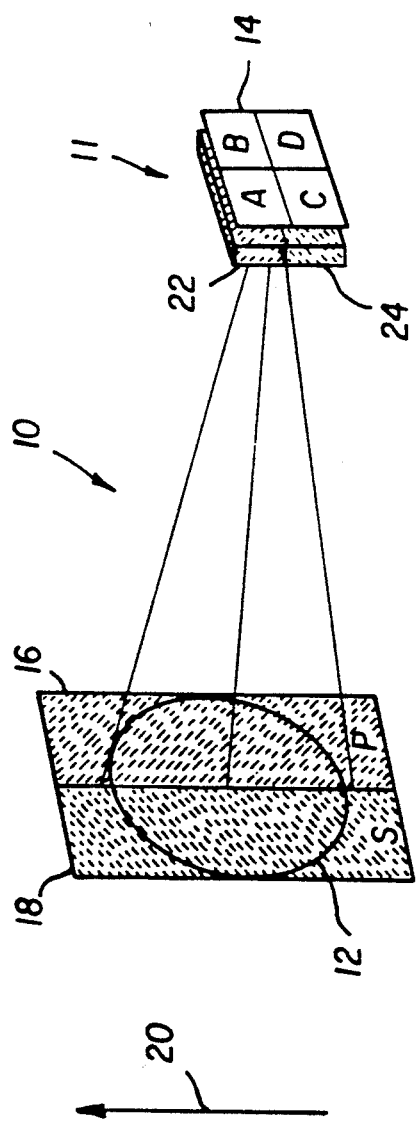
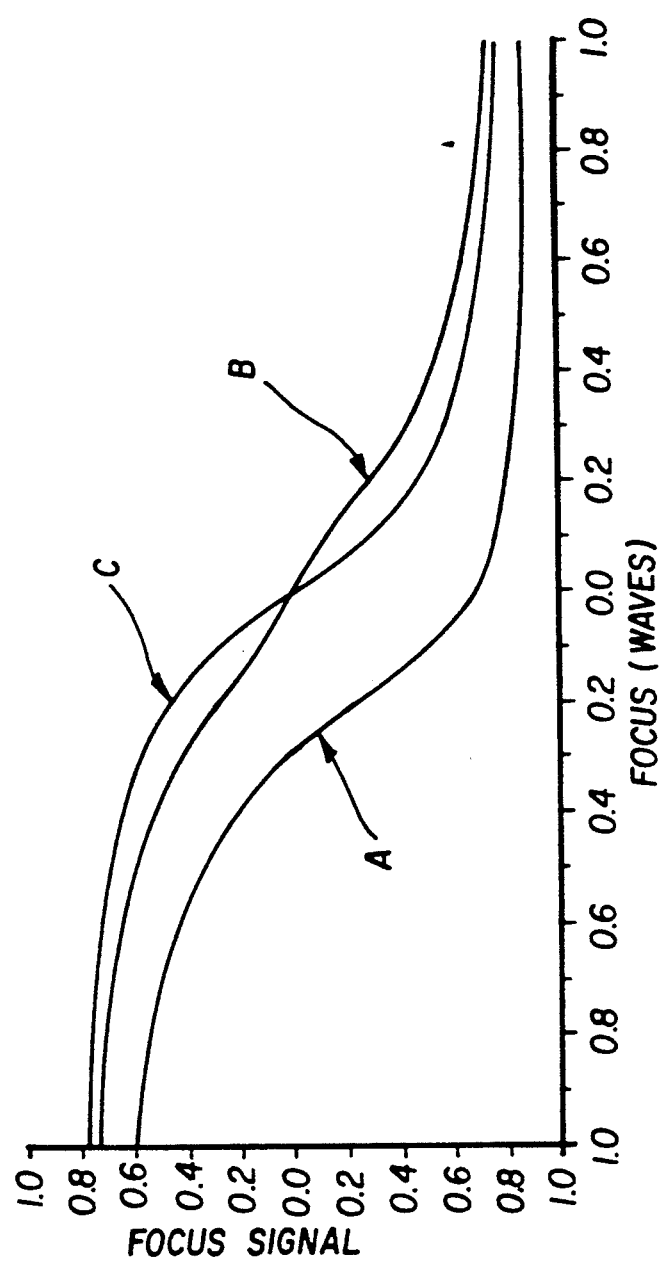
FIG. 1
FIG. 2

| FIGURE | A | B | C | D | TOTAL SIGNAL | FOCUS SIGNAL | APERTURE DIRECTION ERROR | CROSS APERTURE ERROR |
|---|---|---|---|---|---|---|---|---|
| INFOCUS-NOMINAL | 3a | 0 | 1 | 1 | 0 | 2 | 1 | 0 | 0 |
| INFOCUS-RIGHT | 3b | 0 | 1 | 0.75 | 0.25 | 2 | 0.75 | 0 | -0.25 |
| INFOCUS-LEFT | 3c | 0.25 | 0.75 | 1 | 0 | 2 | 0.75 | 0 | 0.25 |
| INFOCUS-UP | 3d | 0 | 1.25 | 0.75 | 0 | 2 | 1 | 0.25 | 0 |
| INFOCUS-DOWN | 3e | 0 | 0.75 | 1.25 | 0 | 2 | 1 | -0.25 | 0 |
| OUTFOCUS-NOMINAL | 3f | 1 | 0 | 0 | 1 | 2 | -1 | 0 | 0 |
| OUTFOCUS-RIGHT | 3g | 0.75 | 0.25 | 0 | 0.75 | 2 | -0.75 | 0 | -0.25 |
| OUTFOCUS-LEFT | 3h | 1 | 0 | 0.25 | 0.75 | 2 | -0.75 | 0 | 0.25 |
| OUTFOCUS-UP | 3i | 1.25 | 0 | 0 | 1 | 2 | -1 | 0.25 | 0 |
| OUTFOCUS-DOWN | 3j | 0.75 | 0 | 0 | 1.25 | 2 | -1 | -0.25 | 0 |

*FIG. 5*

POLARIZATION-BASED AUTO-FOCUS APPARATUS

BACKGROUND OF THE INVENTION

1. Field of the Invention

This invention relates to focus apparatus for use in optical systems, and more particularly, to such apparatus for use as a focus error detector in optical systems.

2. Description of Related Art

In optical systems such as optical information storage systems, it is necessary to maintain the scanning optical beam in sharp focus on the recording element and to also precisely control the beam's lateral position to assure that a desired data track is being followed. In other optical systems, such as drum printers with movable optical heads, it is necessary to control the focus position of the print head in relation to the drum in order to achieve controllable print densities. A variety of detection systems are known for deriving a focus error signal such as systems using knife edge detection, astigmatic beam detection, and spot size detection. None of these systems is entirely satisfactory. Certain of the systems are sensitive to positioning errors of the beam on the detector. Other known systems are sensitive to aberrations induced in the focus beam by the focusing when the beam is not well positioned.

SUMMARY OF THE INVENTION

It is an object of the present invention to overcome the problems in the prior art described above and to provide a relatively simple focus detection system in which the focus detection quality is highly immune to beam positioning errors.

In accordance with one aspect of the invention, there is provided focus apparatus comprising: a lens disposed along an optical axis for forming an image at an image plane; polarizer means at the pupil of the lens, the polarizer means having polarizers arranged to produce different types of polarization in a beam issuing from the lens; detector means positioned at the image plane to intercept a beam from the lens and polarizer means, the detector means having means for detecting radiation in a plurality of areas and analyzer means disposed at the means for detecting radiation, the analyzer means having polarizers arranged at an angle to the polarizers at the lens such that the detector means can detect polarization in one direction in first and second areas of the means for detecting radiation and in a second direction in third and fourth areas of the means for detecting radiation; and circuit means coupled to the means for detecting radiation for producing a focus error signal.

In one embodiment of the present invention, two polarizers of different polarization are disposed at the pupil of a focusing lens. One of the polarizers has, for example, S polarization, and the other of the polarizers has P polarization. A detector is positioned at the image plane to intercept a beam from the lens and polarizer elements, the detector being adapted to detect radiation in a plurality of quadrants. The detector includes a detector element which includes a plurality of photocells and an analyzer which is disposed in front of the detector element. The analyzer includes two polarizers of different polarization arranged at right angles to the polarizers disposed at the pupil of the lens. An electronic circuit is coupled to the detector for producing a focus error signal.

A principal advantage of the focus apparatus of the present invention is that it is relatively insensitive to beam positioning errors. The focus apparatus disclosed herein is particularly suitable for applications such as a focus error detector for an optical disk. Intensity fluctuations do not affect the accuracy of the focus apparatus, since the focus signal is a normalized signal. Further, the focus apparatus is not affected by diffraction efficiency differences between the S and P light at a medium such as an optical disc, since the light from the disk is linearly polarized by the time it reaches the focus apparatus.

Other features and advantages will become apparent upon reference to the following description of the preferred embodiment when read in light of the attached drawings.

BRIEF DESCRIPTION OF THE DRAWINGS

FIG. 1 is a schematic representation of the focus apparatus of the present invention;

FIG. 2 is a graph showing the focus signals produced by a knife edge system and by the present invention for a centered beam and a beam displaced in the cross-aperture direction;

FIG. 5 is a table showing an example of the focus signals and the two error signals as calculated from the detector signals.

DESCRIPTION OF THE PREFERRED EMBODIMENTS

Figure 3A:
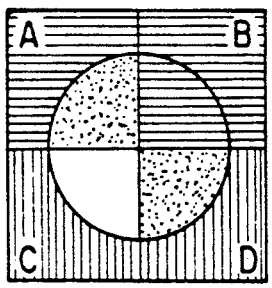
FIGS. 3a–3j are diagrammatic representations of the beam at the detector in both in-focus and out-focus positions for various beam alignment errors.
Figure 3F:
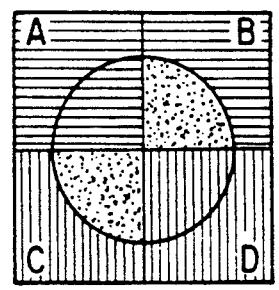
Figure 3B:
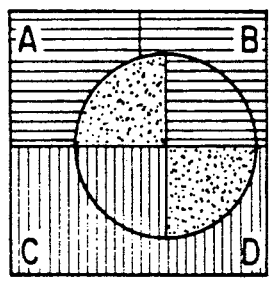
Figure 3G:
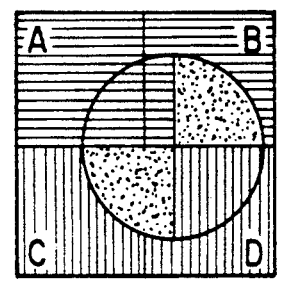
Figure 3C:
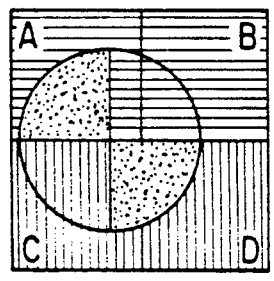
Figure 3H:
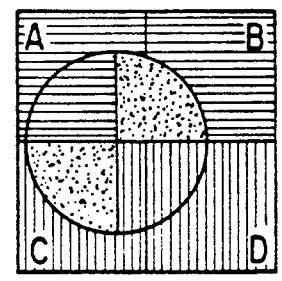
Figure 3D:
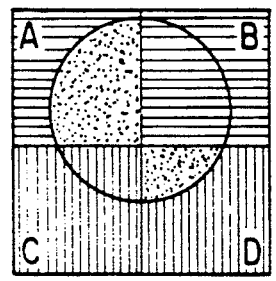
Figure 3I:
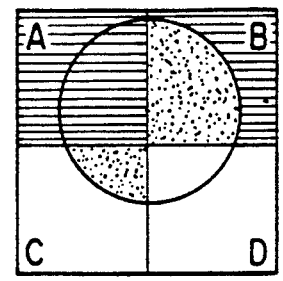
Figure 3E:
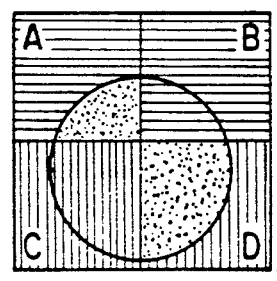
Figure 3J:
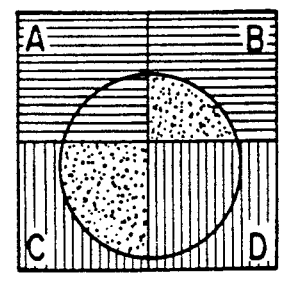

With reference to FIG. 1, there is shown a schematic representation of the focus apparatus of the present invention. Focus apparatus 10 comprises a focusing lens 12 and a detector 11. Linear polarizers 16 and 18 are placed at the exit pupil of the lens 12. The polarization directions of polarizers 16 and 18 are orthogonal. Thus, for example, polarizer 16 can have P polarization, and polarizer 18 can have S polarization. Polarizers 16 and 18 extend in an "aperture direction," as indicated by arrow 20. Detector 11 consists of a quadrant detector element 14 and an analyzer which includes of two linear polarizers 22 and 24. Detector element 14 comprises four areas or quadrants which are labelled A, B, C, and D, and each of the quadrants contains a photocell (not shown). Polarizers 22 and 24 are disposed in a "cross-aperture" direction and are preferably cemented to the detector element 14. Polarizer 22 has P polarization and polarizer 24 has S polarization.

In one representative example of focus apparatus 10, polarizers 16 and 18 can be HR polarizers, made by Polaroid Corp., polarizers 22 and 24 can be 8612 near infrared polarizers, made by Corning Inc, and detector element 14 can be a quadrant detector, made by UDT Sensors Inc.

The focus signal produced by apparatus 10, which is anti-symmetrical about the zero focus position, is given by the following equation:

$$S_{focus} = \frac{(B - A) - (D - C)}{A + B + C + D} \quad (1)$$

where A, B, C, and D are the signals from the four quadrants of detector element 14.

In addition, two additional signals can be derived. A tracking signal for beam displacement in the "aperture direction" is given by:

$$S_a = \frac{(A + B) - (C + D)}{A + B + C + D} \quad (2)$$

and a tracking signal for the beam displacement in the cross-aperture direction is given by:

$$S_{ca} = \begin{cases} \frac{(A - D)}{A + B + C + D} & \text{for } S_{focus} > 0 \\ \frac{(C - B)}{A + B + C + D} & \text{for } S_{focus} < 0 \end{cases} \quad (3)$$

Figure 4:
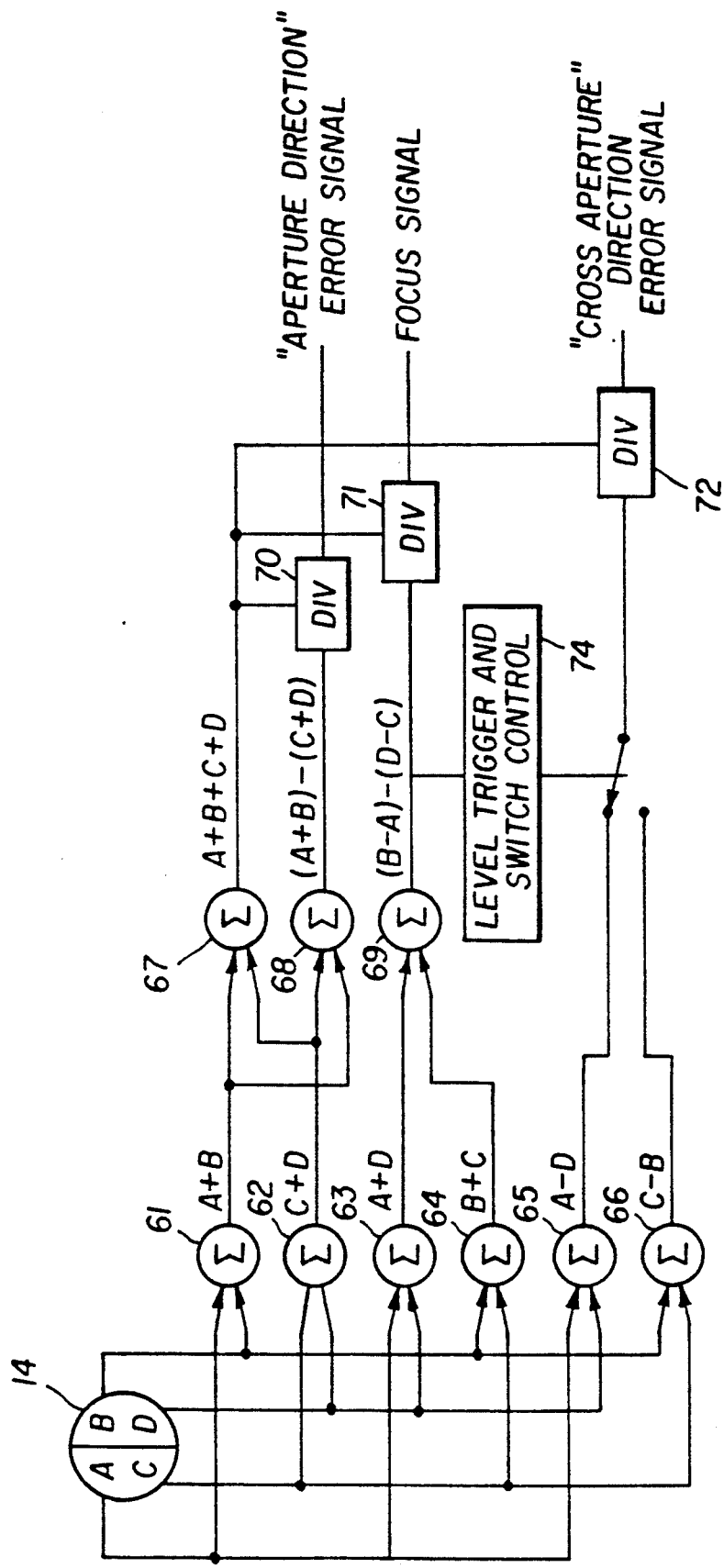
FIG. 4 is a schematic diagram of a circuit for obtaining the focus and error signals from the detector signals.

An electronic circuit 60 for producing the above focus and tracking error signals is shown in FIG. 4. As shown in circuit 60, four signals from detector element 14 (from quadrants A, B, C, and D) are provided to summing circuits 61–69. The values obtained by the summing circuits are then passed through dividers 70–73 to obtain the focus and tracking error signals defined in equations (1)–(3). A level trigger and switch control 74 is adapted to switch the input to divider 72 from summing circuit 65 to circuit 66 when the $S_{focus}$ signal goes from positive to negative in order to obtain a cross-aperture error signal for both in-focus and out-of-focus conditions. (See equation (3).)

With reference to FIG. 5, there are shown exemplary values of focus and error signals produced by apparatus 10 for different positions of the beam on detector 11; as indicated in FIG. 5, these different positions are illustrated in FIGS. 3a–3j. The values of the signals obtained from equations (2) and (3) can be used to align the beam and the detector. The signal, $S_{ca}$, can be used for positioning in the cross-aperture direction, and the signal, $S_a$, can be used for positioning in the aperture direction.

With reference to FIG. 2, there is shown a comparison of the performance of focus apparatus 10 with the performance of knife-edge systems (not shown) for different amounts of detector displacement in the cross-aperture direction. In order to include diffraction, the case of a converging beam with Gaussian apodization was selected. Curves a and b in FIG. 2 show the focus signals of the knife-edge system and of focus apparatus 10, respectively, when the split detector is displaced by 0.3 W where W is the beam radius at the $1/e^2$ level at the focus. It will be seen from curve a that the focus signal of the knife-edge system is non-zero at the focus plane, and from curve b that the focus apparatus of the present invention renders an anti-symmetrical signal with the focus plane at the zero signal. Curve c in FIG. 2 shows the focus signal for both the knife system and focus apparatus 10 with the beam centered on the detector.

Figures 6, 7:
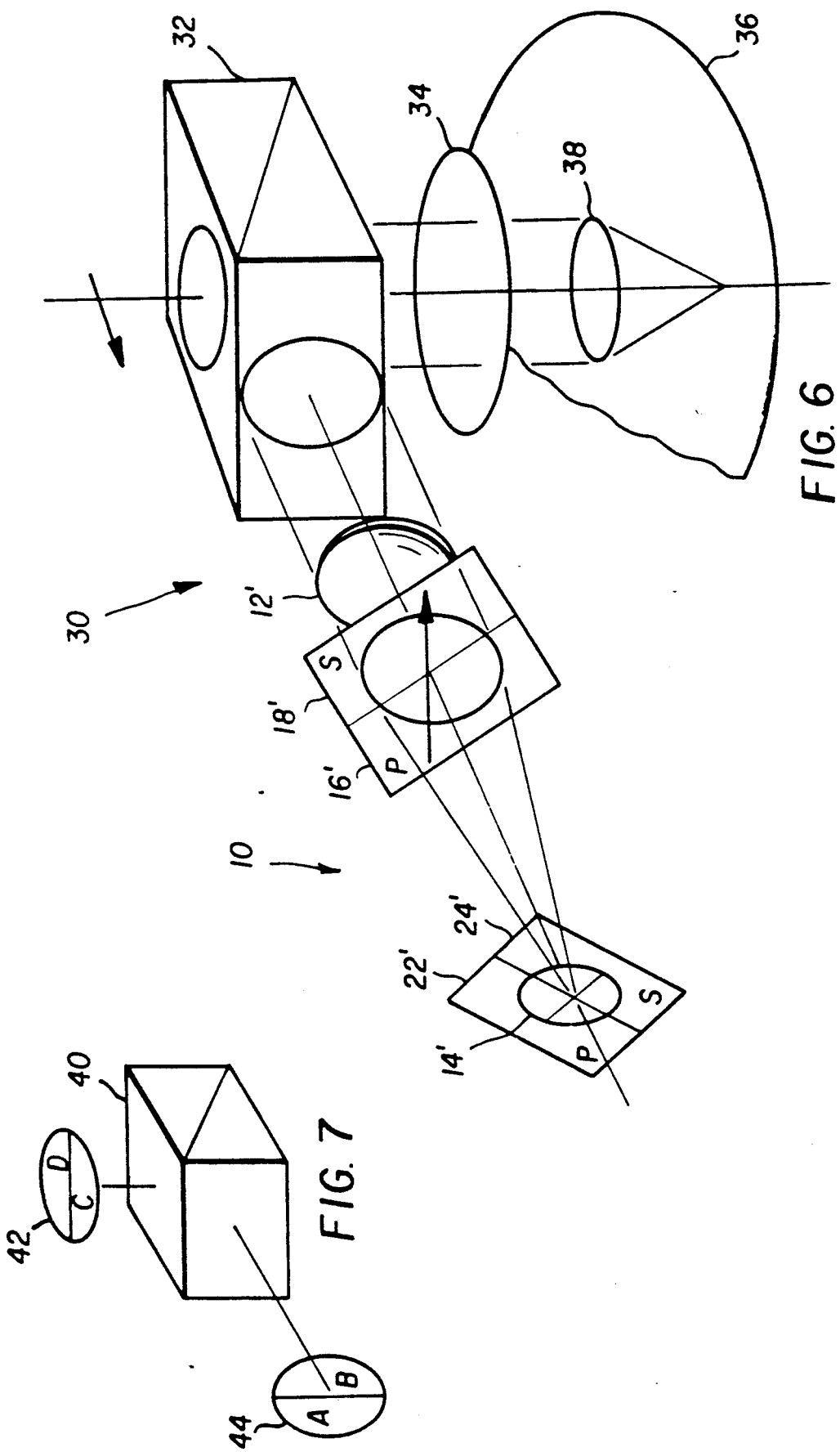
FIG. 6 is a perspective view showing the use of the present invention in an optical information storage system.
FIG. 7 is a schematic diagram of a second embodiment of the present invention in which a polarizing beam splitter is used with two bi-cell detectors.

The present invention can be incorporated in focus apparatus for use as a focus and tracking error detector in an optical information storage system. With reference to FIG. 6, there is shown focus apparatus 30 which includes a polarization beam splitter 32 which receives a beam from a source (not shown) such as a diode laser. Radiation polarized in one direction passes through a quarter wave plate 34 and is imaged onto an optical disk 36 by means of an objective lens 38. A readout beam from optical disk 36 again passes through quarter-wave plate 34 and is directed to focus apparatus 10' by polarization beam splitter 32. Focus apparatus 10' is identical to focus apparatus 10 described above. Apparatus 10' comprises a lens 12' which receives the beam from beam splitter 32. The beam passes through polarizers 16' and 18' at lens 12' and is directed onto polarizers 22' and 24' located in front of a detector element 14'. Focus error signals from detector element 14' are processed in the same manner as described above for detector 11.

In a conventional CD or optical disk system (not shown), media birefringence causes the beam to be elliptically polarized on its return through the beam splitter; as a result, the reflected light intensity is affected and fluctuations (noise) occur in the focus signal. The beam emerging from focus apparatus 10', however, is linearly polarized. Its intensity fluctuations are unimportant, since the focus signal is a normalized signal. This is also the reason that the focus apparatus 10' is not affected by diffraction efficiency differences at the media between the S and P light. By the time the light reaches the focus apparatus, it is linearly polarized.

In apparatus 30, the light entering the focus apparatus 10' can be polarized, as shown in FIG. 6, or unpolarized. For the case of polarized light coming into the focus apparatus, the aperture polarizers can be replaced with half-wave plates, (not shown), where half the aperture will be covered with a half-wave plate oriented at 22.5 degrees to input polarization and the other half of the aperture will be covered by a half-wave plate at −22.5 degrees.

In a second embodiment of the present invention, shown in FIG. 7, a polarizing beam splitter 40 is positioned after the two polarizing elements at the pupil of the lens. In this arrangement, two bi-cell detectors 42 and 44 are used to determine the focus signal. The split detectors can be made narrow so as to have pronounced fall off slopes outside the focus range which is needed for a particular application.

This invention has been described in detail with particular reference to the preferred embodiment thereof, but it will be understood that variations and modifications can be effected within the spirit and scope of the invention.

I claim:

1. Focus apparatus comprising:
   a lens disposed on an optical axis for forming an image of a surface of a recording media at an image plane;
   first polarizer means at the pupil of said lens having polarizers arranged to produce different types of polarization in a beam transmitted through said lens;
   detector means positioned at said image plane to intercept said beam from said lens and said first polarizer means, said detector means having four detection quadrants;
   analyzer means including second polarizer means disposed adjacent said detector means for detecting said beam produced from said first polarizer means, said second polarizer means having two different polarizations arranged at an angle to said first polarizer means such that said detector means can detect light polarized in a first direction in first and second detection quadrants and light polarized in a second direction in third and fourth detection quadrants; and circuit means connected to said detection quadrants to produce a focus error signal.

2. Focus apparatus, as defined in claim 1, wherein said first polarizer means includes two polarizers having orthogonal polarization.

3. Focus apparatus, as defined in claim 2, wherein said analyzer means includes two polarizers having orthogonal polarization.

4. Focus apparatus, as defined in claim 3, wherein said polarizers in said analyzer means are disposed at a right angle to the polarizers in said first polarizer means.

5. Focus apparatus, as defined in claim 1, wherein a photodetector is disposed in each of said quadrants.

6. Focus apparatus, as defined in claim 1, wherein said circuit means includes means for determining a value for the focus error signal, $S_{focus}$, according to the formula:

$$S_{focus} = \frac{(B - A) - (D - C)}{A + B + C + D}$$

where A, B, C, and D are the signals from said first, second, third, and fourth quadrants, respectively.

7. Focus apparatus, as defined in claim 6, wherein said circuit means includes means for determining a beam displacement signal, $S_a$, in an aperture direction according to the formula:

$$S_a = \frac{(A + B) - (C + D)}{A + B + C + D}$$

8. Focus apparatus, as defined in claim 7, wherein said circuit means includes means for determining a beam displacement signal, $S_{ca}$, in a cross-aperture direction according to the formula:

$$S_{ca} = \begin{matrix} \frac{(A - D)}{A + B + C + D} \text{ for } S_{focus} > 0 \\ \frac{(C - B)}{A + B + C + D} \text{ for } S_{focus} < 0 \end{matrix}$$

9. Focus apparatus for use in an optical information storage system, said apparatus comprising:

means for scanning a focused optical beam on information tracks of an optical recording element to produce an image of the surface of said recording element which is reflected along an optical axis;

a lens disposed along said optical axis for receiving an image reflected from the recording element surface at an image plane;

polarizer means at the pupil of said lens, said polarizer means having polarizer elements arranged to produce two types of polarization in said reflected image transmitting through said lens;

detector means positioned at said image plane to intercept said reflected image transmitting through said lens and said polarizer means, said detector means having means for detecting radiation in a plurality of quadrants and analyzer means having polarizer elements arranged at a right angle to said polarizer elements said polarizer means at said lens such that said detector means can detect polarization in first direction in two quadrants and in a second direction in two other quadrants; and circuit means coupled to said detectors for producing a focus error signal.

10. Focus apparatus, as defined in claim 9, wherein said circuit means includes means for producing a beam displacement signal in an aperture direction.

11. Focus apparatus, as defined in claim 10, wherein said circuit means includes means for producing a beam displacement signal in a cross-aperture direction.

12. Focus apparatus for use in an optical information storage system, said apparatus comprising:

means for scanning a focused optical beam on information tracks of an optical recording element to produce an image of the surface of said recording element which is reflected along an optical axis;

a lens disposed along said optical axis for receiving an image reflected from the recording element surface at an image plane;

polarizer means at the pupil of said lens, said polarizer means having elements arranged to produce two types of polarization in said reflected image transmitting through said lens;

means for receiving said reflected image transmitting through said lens and polarizer means and for directing polarization of a one type to a first image plane and polarization of another type to a second image plane; and detector means positioned at each of said image planes to intercept said reflected image directed by said directing means, each of said detector means having means for detecting radiation in two areas and analyzer means having polarization in a predetermined direction; and circuit means coupled to said detector means for producing a focus error signal.

* * * * *